(12) United States Patent
Klingler et al.

(10) Patent No.: US 9,986,743 B2
(45) Date of Patent: Jun. 5, 2018

(54) BAKING PAPER COATED WITH A SILICONE-CONTAINING EMULSION

(71) Applicant: WACKER CHEMICAL CORPORATION, Adrian, MI (US)

(72) Inventors: Christine Klingler, Pittsford, MI (US); Timothy Rummel, Saline, MI (US); Kathleen Beekel, Adrian, MI (US); Keith Stowell, Morenci, MI (US)

(73) Assignee: WACKER CHEMIE AG, Munich (DE)

( * ) Notice: Subject to any disclaimer, the term of this patent is extended or adjusted under 35 U.S.C. 154(b) by 165 days.

(21) Appl. No.: 15/074,102

(22) Filed: Mar. 18, 2016

(65) Prior Publication Data

US 2017/0265480 A1    Sep. 21, 2017

(51) Int. Cl.
| | |
|---|---|
| *A21B 3/15* | (2006.01) |
| *C09D 5/02* | (2006.01) |
| *C09D 123/08* | (2006.01) |
| *C09D 131/04* | (2006.01) |
| *D21H 19/22* | (2006.01) |
| *D21H 19/32* | (2006.01) |
| *D21H 27/00* | (2006.01) |
| *D21H 17/59* | (2006.01) |
| *D21H 19/20* | (2006.01) |
| *D21H 21/52* | (2006.01) |

(52) U.S. Cl.
CPC ............... *A21B 3/15* (2013.01); *C09D 5/022* (2013.01); *C09D 123/0853* (2013.01); *C09D 131/04* (2013.01); *D21H 17/59* (2013.01); *D21H 19/20* (2013.01); *D21H 19/22* (2013.01); *D21H 19/32* (2013.01); *D21H 21/52* (2013.01); *D21H 27/00* (2013.01); *D21H 27/001* (2013.01)

(58) Field of Classification Search
CPC ........................................................ A21B 3/15
USPC .......................................................... 428/327
See application file for complete search history.

(56) References Cited

U.S. PATENT DOCUMENTS

| | | | |
|---|---|---|---|
| 4,812,510 | A | 3/1989 | Barnett et al. |
| 5,629,387 | A | 5/1997 | Frances et al. |
| 5,770,840 | A * | 6/1998 | Lorence ............ B65D 77/0433 219/730 |
| 7,153,913 | B2 | 12/2006 | Lautenschlager et al. |
| 7,238,755 | B2 | 7/2007 | Herzig et al. |
| 7,592,412 | B2 | 9/2009 | Cray et al. |
| 2006/0058486 | A1 | 3/2006 | Lautenschlager |
| 2007/0208132 | A1 | 9/2007 | Geisberger et al. |
| 2010/0215922 | A1* | 8/2010 | Rajaraman ............ C07F 7/0818 428/195.1 |
| 2014/0088249 | A1 | 3/2014 | Daniels |
| 2016/0095170 | A1* | 3/2016 | Kim ..................... H05B 6/1209 219/621 |

FOREIGN PATENT DOCUMENTS

| | | | | |
|---|---|---|---|---|
| KR | 20130005203 | * | 1/2013 | ............. A47J 36/04 |
| WO | 03/029375 A1 | | 4/2003 | |
| WO | 2013/029992 A1 | | 3/2013 | |
| WO | 2016/001237 A1 | | 1/2016 | |

* cited by examiner

*Primary Examiner* — Terressa Boykin
(74) *Attorney, Agent, or Firm* — Brooks Kushman P.C.

(57) ABSTRACT

Baking papers suitable for a wide range of baked goods have a non-stick coating prepared by coating a suitable substrate with an aqueous coating composition comprising an EVA copolymer dispersion and a hydrosilylation curing silicone emulsion, wherein the EVA copolymer dispersion has an EVA copolymer particle size of less than 500 nm and is surfactant-stabilized.

20 Claims, 1 Drawing Sheet

BAKING PAPER COATED WITH A SILICONE-CONTAINING EMULSION

BACKGROUND OF THE INVENTION

1. Field of the Invention

The invention pertains to silicone-containing baking papers which do not present health concerns, and which provide non-stick performance with a variety of foods processed at high temperatures.

2. Description of the Related Art

An age-old problem in both home baking and industrial baking industry concerns the ability to remove baked (or heated) foodstuffs from their baking pan. Centuries old solutions to these problems have involved, inter alia, greasing the pan with butter, lard, vegetable oils or other oleaginous substances, at times then applying flour over the oleaginous coated surfaces. These methods are in wide use, but are only partially effective. Moreover, these methods are not effective for a wide range of foodstuffs, for example candies, caramel apples, etc.

On an industrial scale, the methods previously described are even less suitable, as considerable manual labor is associated with preparing baking pans, and the pans must be intensively washed and dried prior to the next use.

The availability of pans coated with fluorinated polymers such as TEFLON®, or pans coated with silicones or even constructed entirely of silicone have become useful, in particular in home baking. However, these products are often unsuitable for commercial operations due to their higher cost, and the propensity to receive surface damage from repeated use. Moreover, like pans coated with oleaginous substances, a thorough washing is generally required.

To avoid these problems, or to minimize the amount of cleaning which must be performed, baking papers have been used. Baking papers have been provided in several variants. Parchment paper, for example, has been used for this purpose, but generally requires greasing and flouring. The parchment paper, even though greased and floured, still sticks to some foods tenaciously, although not generally to the pan. Its use involves considerable manual labor.

Waxed paper has been available for decades, but is effective on some baked foods but not others. In particular with foods which have a considerable fat content, the fatty substances may partially dissolve the wax and strongly adhere to the paper. Wax paper cannot be used in high heat applications.

Silicone-coated baking papers have also been available, but like wax paper, are not suitable for use with some baked foods. For example, such coatings have poor grease and oil resistance. These coatings are also expensive.

The industry standard baking papers are papers coated with formulations which contain chromium stearate. One example is QUILON® coated parchment paper. Again, such coatings are not useful with all baked goods. In particular, like silicone coatings, these coatings have low grease resistance. Moreover, the use of chromium compounds is under severe scrutiny. For example, chromium stearate-coated paper cannot be used in a wet batter application.

As can be seen from the prior discussion, baking papers must perform satisfactorily on a wide range of baked goods, and selection of suitable coatings must not only take into account possible health-related effects, but also the temperatures involved. In the latter respect, "baking" and "baked," in the context of the invention, applies to operations for forming foodstuffs which will contact the baking paper at elevated temperatures. For example, this may include depositing a heated candy or the like onto the baking paper without any actual time in a hot oven, or more traditional baking operations such as the baking of bread, muffins, scones, cookies, cakes, soufflés, pies, and the like. Thus, the suitability of a coating formulation cannot be assessed based on use of similar formulations for room temperature or close to room temperature operations. For example, silicone-coated paper, chromium stearate-coated paper, and wax paper all generally behave flawlessly at room temperature, with a wide variety of foodstuffs, yet all suffer from deficiencies at elevated temperature with at least some foodstuffs. Behavior as a baking paper is unpredictable.

The wide variety of foodstuffs and their constituents contributes to the problems of suitable baking paper coatings. For example, many foods contain proteinaceous substances such as whey, casein, albumin, and gluten, and which at least partially denature during the baking process, forming sticky gels. Sugars frequently caramelize during baking, condensing to very sticky substances. Other constituents may include oleaginous substances such as butter, lard, or vegetable oils. Some foods, such as fruit pies, may contain acidic substances (fruit acids), while others, such as shortbreads, corn breads, and cakes, may be basic due to the use of inorganic leavening agents such as baking soda.

There has been a long felt need to provide a coated baking paper whose use is acceptable with respect to human consumption, which is economical to produce, and which is effective for a wide variety of baked goods.

SUMMARY OF INVENTION

It has now been surprisingly and unexpectedly discovered that baking papers which have been coated with an aqueous emulsion containing 90 to 50 wt. % a surfactant-stabilized ethylene/vinyl acetate copolymer dispersion with mean particle size <500 nm, as more fully described below, and from 10 wt. % to 50 wt. % of a hydrosilylation-curable silicone, and then cured, possess high non-stick performance with a wide variety of baked goods. The coatings can easily be prepared and cured, and are economical as well.

DETAILED DESCRIPTION OF THE PREFERRED EMBODIMENTS

Figure 1:
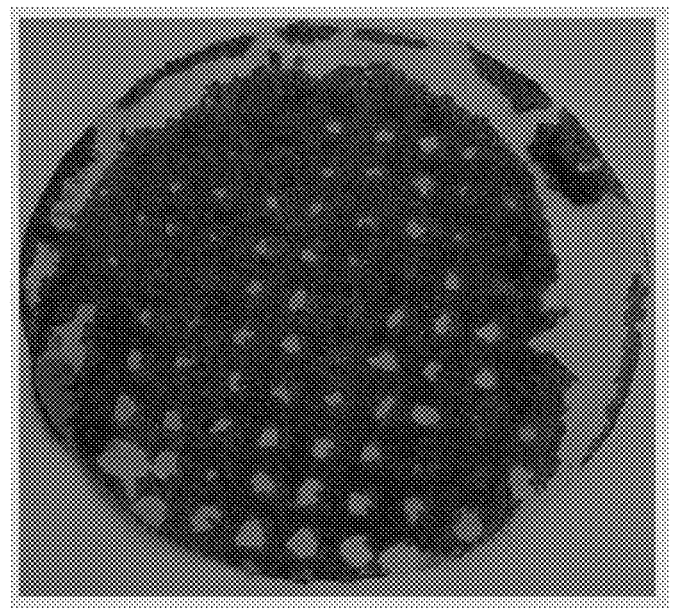
FIG. 1 Prior art baking paper showing cake residue.
Figure 2:
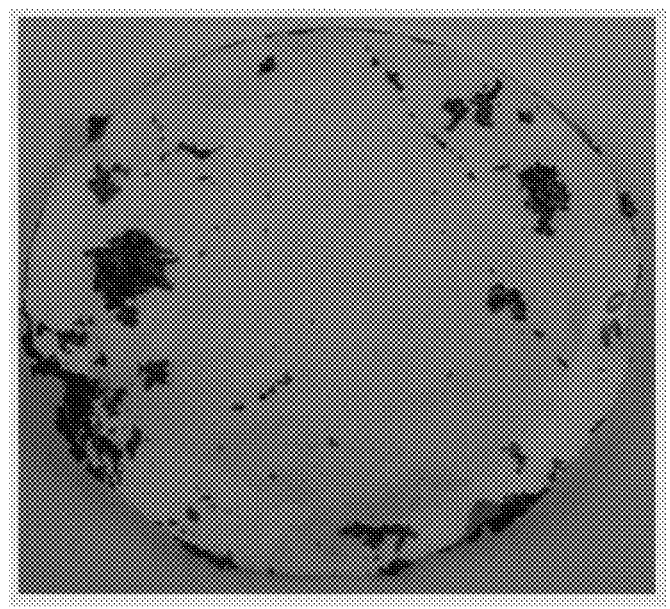
FIG. 2 Inventive baking paper showing less cake residue.

By the term "baked goods" is meant any foodstuff, whether for human or animal consumption, which contacts a baking paper while at an elevated temperature. Examples include candies such as taffy, including hard taffy, caramel, toffee, chocolates, ganaches, and all confections which are applied to a baking paper at an elevated temperature. Such confections are ordinarily prepared at, for example, from 50° C. to well over 250° C. and deposited onto a baking paper. "Baked goods" also applies to pies, cakes, cookies, scones, shortbreads, gluten-containing and non-gluten containing breads, muffins, flat breads, tortilla chips or shells, and the like, which are baked at temperatures generally ranging from about 90° C. to about 260° C.

By "baking paper" is meant a flat substrate which can be used to receive baked goods. The flat substrate is preferably a paper substrate formed from cellulosic fibers, examples of which include, but are not limited to, unbleached Kraft process paper, bleached paper, glassine paper, parchment paper, and the like. Suitable substrates also include aluminium foil, although this is not preferred. A feature of the invention is that due to the effectiveness of the inventive coating, generally inexpensive paper substrates, calendered or uncalendered, may be used. Stiff substrates such as cardboard may also be useful for some applications. It should be noted that while the inventive baking papers can also be used for foodstuffs which are not baked, e.g. ice cream, sherbets, and the like, the baking paper per se must still have adequate performance at high temperatures.

By "grease resistance" is meant resistance to grease as measured by the Turpentine Test (TAPPI T454). Grease resistance is an important property, but is superceded by actual baking tests.

"Non-stick performance" is assessed by the observable performance relative to baking cookies, chocolate cake, macaroons, and caramel, using standardized recipes as disclosed hereafter. Upon removal of the baked good from the baking paper, the residue which adheres to the paper is visually observed. Pass/fail scoring can be qualitatively used, with "pass" representing no or little residue and "fail" indicating moderate to heavy residue, or damage to the baked good upon removing from the baking paper.

The coated baking papers of the present invention are prepared by applying an aqueous emulsion of the non-stick formulation to a substrate, preferably a paper substrate, and curing and drying at elevated temperature. Coating methods for paper and other substrates are well known in the industry, and include, for example, doctor blade coating, spray coating, falling film coating, and the like. The coating process is followed by curing and drying.

Curing and drying preferably take place together, for example by conducting the substrate with applied coating formulation through a curing oven or curing tunnel maintained at a temperature which activates the hydrosilylation catalyst contained in the composition. Water is removed at the same time. However, curing and drying can be effected separately as well.

The coating formulation preferably comprises from 5 wt. % to about 40 wt. % solids, the remainder comprising essentially water. While water miscible solvents may be present in the aqueous phase as well, their use is not preferred, due to the VOC emissions they would create. The compositions thus preferably contain no water miscible solvents.

The composition, since it is an aqueous dispersion, may contain emulsified, higher molecular weight hydrocarbon (oxy) compounds such as esters, ketones, glycols, polyglycols, or $>C_8$ hydrocarbons as film forming additives or coalescing additives, however, their use is not preferred.

The active ingredients of the aqueous dispersions are a surfactant-stabilized ethylene/vinyl acetate copolymer of small particle size and a hydrosilylation-curable organopolysiloxane emulsion. An emulsion stabilizer is also generally necessary.

Ethylene/vinyl acetate ("EVA") polymers are well known and commercially available from numerous sources, for example under the trademark VINNAPAS® polymers from Wacker Chemie, Munich, Germany. The EVA copolymers are prepared by the aqueous suspension or emulsion copolymerization of ethylene with vinyl acetate. The result is an aqueous dispersion of fine EVA particles. The EVA copolymer dispersion may be used directly, the water content of the dispersion supplying at least a portion of the water content of the coating formulation, or may be dried and used in powder form. When in dry form, the copolymer is preferably in the form of a redispersible polymer powder ("RDP") rather than an ordinary powder. RDPs are prepared by adding a drying assistant to the copolymer aqueous dispersion prior to drying, which is ordinarily a spray drying process. An advantage of an RDP as compared to an ordinary copolymer powder is that upon redispersion, the resulting dispersion exhibits polymer particle sizes very similar or even indistinguishable from the particle sizes of the polymer particles in the aqueous dispersion as produced, whereas "non-RDP" powders, when dispersed in water, have much larger particle sizes due to agglomeration in the drying process. RDP EVA copolymers are also commercially available.

The ethylene content of the EVA copolymers may vary over a wide range, for example, but not by limitation, from about 1 weight percent to about 50 weight percent or more, preferably from 1 to about 30 weight percent, and more preferably about 5 to about 20 weight percent.

The remainder of the copolymer consists essentially of vinyl acetate residues. By "consists essentially of" is meant that other addition polymerizable monomers may have also been used, in amounts less than 20 weight percent, and in any case, the type and amount of comonomer cannot substantially affect either the non-stick performance or the use of the baking paper for contact with food for human consumption. Preferably, no more than 10 weight percent of monomers other than ethylene and vinyl acetate are used, more preferably no more than 5 weight percent. Most preferably, the copolymers consist only of polymerized ethylene and vinyl acetate.

Examples of suitable comonomers, when used, include acrylic acid, crotonic acid, methacrylic acid, alkyl(meth) acrylates such as ethyl acrylate, methylmethacrylate and butyl acrylate, other vinyl esters such as propenyl acetate and isopropenyl acetate, and higher vinyl esters with long chain, preferably α-branched alkyl groups, such as the VeoVa® acetate monomers from Resolution Products. It is preferable to avoid comonomers such as vinyl chloride and styrene. Other suitable comonomers include higher alkenes such as butenes and octenes, and alkadienes such as butadiene.

The EVA copolymer is preferably one which is approved for contact with food for human consumption. However, baking papers may also be prepared which do not require regulatory approval, or which are subject to less stringent requirements, such as baked goods for animal consumption.

Surprisingly, it has been found that only certain EVA copolymers are useful. To be successful, the EVA copolymers must be surfactant stabilized, and must have a mean particle size of less than 500 nm.

The use of surfactants to perform emulsion polymerization is well known, and many surfactant-stabilized EVA emulsions are available. Suitable surfactants are described, for example, in Houben-Weyl, "Methoden der organischen Chemie," Vol. XIV (1), MACROMOLECULARE STOFFE (Macromolecular Substances), Georg-Thieme-Verlag, Stuttgart, 1961, pp. 411-420; D. C. Blackley, EMULSION POLYMERIZATION, Applied Science, London, 1975; and J. L. Gardon, "Emulsion Polymerization," Chapter 6 in POLYMERIZATION PROCESSES, C. E. Schildknecht, Ed., Wiley-Interscience, New York, 1977. The surfactants may be anionic, cationic, zwitterionic, or non-ionic. Anionic and non-ionic surfactants are preferred, preferably anionic surfactants or mixtures of anionic and non-ionic surfactants. Gemini surfactants are also useful. The surfactant(s) should be of such a type and used in such an amount that the dispersion of the EVA polymer is safe for contact with food.

EVA polymers stabilized with polyvinyl alcohol protective colloids are well known. However, it was surprisingly found that polyvinyl alcohol, when used in conventional amounts as a protective colloid for the EVA polymers, does not provide compositions with suitable release properties. Thus, the subject invention baking papers employ surfactant-stabilized EVA polymer dispersions. However, it would be within the spirit of the invention to employ EVA polymers where the stabilizing system consists essentially of surfactants, e.g. small amounts of polyvinyl alcohol or other protective colloids may be present in amounts which do not substantially affect non-stick properties, when conventional surfactants are used. If any polyvinyl alcohol stabilizer is present, it is preferably present in amounts of less than 1% by weight, preferably less than 0.5% by weight, based on solids of the EVA dispersion. Polyvinyl alcohol is preferably absent.

Suitable EVA dispersions may be prepared by the general methods known to the art, and as an example, as disclosed in U.S. published application 2014/0088249 A1, which is incorporated herein by reference. The '249 application also discloses suitable surfactants as well as copolymerizable monomers which can be used in addition to ethylene and vinyl acetate, as previously described. Further methods are disclosed in U.S. Pat. No. 4,812,510.

The particle size is important to the functioning of the non-stick baking papers, and must be less than 500 nm. Mean particle sizes in the range of 20 nm to 400 nm are preferred, more preferably 100 nm to 350 nm, and most preferably 150 nm to 300 nm. Mean particle size may be measured by numerous methods well known to those skilled in the art, for example, by size exclusion chromatography, dynamic light scattering, etc. Instruments for such techniques are commercially available from numerous suppliers, including Malvern Instruments, Horiba, Brookhaven Instruments, and Microtrac. In each case, the instrument used should be calibrated against known standards. For example, exceptionally uniform microspheres are available with sizes ranging from 20 nm to 1000 μm from Duke Scientific Corporation, and from other sources as well. It is preferred that the instruments are calibrated against both 100 nm and 200 nm NIST acceptable standards. It is the calibration against standards of precision particle size which allows numerous different instruments and methods to be used while obtaining substantially the same results. the standard deviation of the measurements is generally within 10% of actual diameter, preferably within 5%. Thus, a mean diameter of 400 nm implies that the measured diameter will be within ±40 nm when the instrument is calibrated with 100 nm and 200 nm standards. A preferred measurement method is Capillary Hydrodynamic Fractionation (CHDF) using a CHDF2000 or CHDF3000 unit from Matec Applied Sciences, Northborough Mass. This method is preferred.

When used as an aqueous dispersion, the solids content may be any solids content which facilitates the preparation of a coating composition with the desired EVA copolymer content. Dispersions are available with a wide range of solids content. Ranges of 20 to 60 weight percent are preferable, more preferably 40 to 55 weight percent. On the high end, the weight percentage is generally limited only by dispersion stability. On the low end, the weight percentage is limited by the increased water content, which might then not enable a coating formulation of the desired EVA copolymer content to be prepared. The EVA copolymer dispersions may also be used in conjunction with an EVA RDP copolymer powder.

The solids content of the EVA copolymer in the coating formulation, relative to the total of EVA copolymer and hydrosilylation-curable organopolysiloxane composition, both calculated based on solids, is from 10 wt. % to 90 wt. %, more preferably 20 wt. % to 80 wt. %, yet more preferably 30 to 70 weight percent, and most preferably 40 to 60 weight percent. At very low weight percentages, the grease performance may be compromised. At higher weight percentages, non-stick performance may be compromised.

The hydrosilylation-curable organopolysiloxane composition includes at least one organopolysiloxane containing silicon-bonded hydrogen (Si—H). The organopolysiloxane may be oligomeric, e.g. with a weight average molecular weight below 1000, or may be polymeric, with a molecular weight above 1000. The organopolysiloxane may be linear, branched or cyclic. The Si—H functionality may be terminal, as in an α,ω-[Si—H]-functional linear polydimethyl siloxane, or may be chain-pendant, with Si—H functionality spread throughout the polymer chain, for example in a definite or a random manner. In branched organopolysiloxanes, especially highly branched organopolysiloxanes, terminal Si—H groups are preferred. Of all the Si—H functional organopolysiloxanes present, it is preferable, on average, that at least two Si—H groups are present per molecule.

The hydrosilylation-curable organopolysiloxane formulation also includes at least one component having, on average, at least two hydrosilatable groups, i.e. alkyne or alkene groups, preferably alkene groups. This component may be a hydrocarbon bearing two or more ethylenically unsaturated groups, such as 1,5-hexadiene, 1,7-octadiene, norbornadiene, 1,3-cyclooctadiene, or similar compounds; may be, for example, an olefin-terminated polyoxyalkylene polyol such as an α,ω-bis[allyl-terminated] polyoxyethylene or polyoxypropylene diol; or a compound containing multiple (meth)acrylate groups, such as hexanediol diacrylate or glycerine triacrylate.

Preferably, however, the hydrosilylatable compound is another organopolysiloxane bearing olefinically unsaturated groups, preferably a polydimethylsiloxane bearing two or more vinyl groups, as terminal groups, pendent groups, or both terminal and pendent groups. Mixtures of hydrosilylatable hydrocarbons and hydrosilylatable organopolysiloxanes may also be used. Most preferably, no hydrosilylatable hydrocarbons are used.

The cured products of the hydrosilylation-curable organopolysiloxane compositions are technically silicone elastomers, although these may be very hard elastomers. The hardness can be adjusted within a reasonable range by selection of the total average numbers of Si—H groups and hydrosilylatable groups, e.g. the crosslink density. The amounts of crosslinkable groups is easily determined by one skilled in the art. U.S. Pat. Nos. 7,153,913; 7,238,755; 7,592,412; and U.S. published applications 2006/0058486 and 2007/0208132, all describe hydrosilylation-curable organopolysiloxane compositions, functionalities and catalysts. These references are hereby incorporated by reference. Also relevant as state of the art is WO 03/029375.

The coating compositions also require a hydrosilylation catalyst. Such catalysts are well known, and many are described in the patents previously incorporated by reference. Platinum catalysts such as hexachloroplatinic acid, Karstedt catalysts, and Speier catalysts are suitable, for example. The amount of catalyst is conventional, but must be sufficient to provide a substantially cured coating on exit from the curing oven. For example, from 10 to 500 ppm catalyst, calculated on the basis of elemental platinum per 100 parts of hydrosilylation-curing composition, preferably 250 ppm, is suitable. The catalyst is preferably added to the composition just prior to coating, to avoid premature cure. The catalyst may be added in the form of an emulsion of one (but not both) of the reactive components of the composition.

Since the coating composition is an aqueous emulsion/dispersion, an emulsion stabilizer is preferably used to maintain a stable dispersion. In this context, "stable" means that the emulsion shows little or no phase separation or creaming, e.g. no observable phase separation, sedimentation, or creaming for at least 2 weeks at 25° C. "Stable" also refers to compositions which exhibit some phase separation, sedimentation, or creaming, but can be readily redispersed by simple stirring.

The emulsion stabilizer may be added separately, e.g. neat, dissolved in solvent, or as an emulsion, but may also be supplied with the EVA copolymer dispersion (or RDP) or one or more hydrosilylatable silicone emulsions, since all of these generally contain an emulsion or dispersion stabilizer. RDPs, for example, generally contain a relatively large amount of surfactant, and their EVA copolymer dispersions do also, although generally in reduced amounts. The components of the hydrosilylation-curable silicone composition may be supplied as separate emulsions or as a single emulsion containing all components. In either case, emulsion stabilizers are necessary. These are surfactants, frequently non-ionic surfactants such as polyoxyethylated aliphatic alcohols or glycols, or combinations of non-ionic surfactants and anionic, cationic, or zwitterionic surfactants. All these are well known in the art.

It has been found that it is highly preferable to add further stabilizers over and above those supplied in the EVA and silicone emulsions. For this use, it is highly desirable that food grade stabilizers are used. These include, for example, natural, biosynthetic, or synthetic polysaccharide and polypeptide gums, preferably polysaccharide gums. Suitable gums include, for example, gum arabic, tragacanth gum, guar gum, locust bean gum, and the like. A preferred stabilizer comprises xanthan gum. A benefit of using such gums is not only increasing emulsion stability, but also increasing the ease of coating of the substrate. Such gums are also approved for human consumption, whereas many surfactants are not. Shear thinning stabilizers are preferred. Xanthan gum is one of these.

The stabilizer may be used in amounts of 0.01 to 1 weight percent, preferably 0.05 to 0.5 wt. %.

The composition may contain additional additives as well. Among the additional additives are foam control agents and biocides.

A suitable foam control agent is Silfoam SE33, available from Wacker Chemie. The amount of foam control agent is preferably the minimum required to prevent foaming during agitation, and particularly during application to the substrates. Amounts of 0.05-1 weight percent, preferably 0.1 to 0.5 weight percent are suitable. Suitable biocides include any biocide acceptable for food applications. Since the biocide is only necessary for storage of the coating emulsion, it may be possible in many cases to provide compositions which are free of biocide.

To prepare the coating compositions, the ingredients are mixed in any order. If the hydrosilylation catalyst is included in the silicone phase of an alkenyl-functional silicone emulsion, the catalyst emulsion may be mixed together with all the ingredients. If, however, the catalyst is contained in a component containing both hydrosilylatable compound and Si—H-functional silicone, then the catalyst should be added just prior to coating. Mixing of the ingredients may take place by simple stirring, for example employing simple paddle stirrers.

Preferred compositions contain about 15-50 weight percent of the hydrosilylation-curing silicone components, based on total solids, more preferably 20 to 40 weight percent.

The coating composition may also contain organopolysiloxane fluids, such as hydroxyl-terminated polydimethylsiloxanes or trimethylsilyl-terminated polydimethylsiloxanes. The composition may also include silicone resins such as T resins, MT resins, MQ resins, MQT resins, and variants of such resins containing D units as well. Such resins are well known and are commercially available. The resins, in addition to alkyl groups as substituents, may also include silicon-bonded-OH and alkoxy groups such as ethoxy groups.

The coating compositions are applied to the substrate such as to apply a dry coating area weight of from 0.2 to 1.0 $g/m^2$, preferably 0.4 to 1.0 $g/m^2$, and most preferably 0.5 to 0.7 $g/m^2$. The coatings are preferably dried at temperature ranging from 120° C. to 180° C., more preferably 140° C. to 160° C., and at a temperature at which the hydrosilylation catalyst becomes active.

The hydrosilylatable silicone composition can further contain a catalyst inhibitor. Catalyst inhibitors are well known. One class of suitable catalyst inhibitors is the class of alkyne diols, for example Dehydrolinalool from BASF.

To test the suitability of any given coating, the coated baking paper is tested with the turpentine test (TAPPI T 454 an-94). This test procedure is widely known, and assesses resistance to penetration/absorption of turpentine, which assesses grease resistance. The time at which a visual staining (wet spot) is observed is measured. The longer the time period, the more grease resistant is the coating.

The suitability of a given coating is also tested by actual baking tests. While these tests are partially subjective, they provide a clear assessment of non-stick properties to one skilled in the art. For these tests, the following were used:

Cookie Test: Refrigerated "ready-to-bake" cookie mix. Baked at 177° C. for 15 minutes. A passing grade requires that the baked cookies are removed easily without sticking.

Chocolate Cake: 120 g. of commercial chocolate cake mix is prepared as directed, poured into a springform pan lined with baking paper, and baked at 160° C. for 35 minutes. Upon removal from the oven, the side (ring) is removed and the cake is cooled for 20 minutes. The baking paper is cautiously removed from the cake and observed for residue.

Macaroon: A macaroon recipe of 400 g shredded coconut, 280 g sweetened condensed milk, and 2 egg whites (ca. 66 g) were stirred together and baked at 160° C. for 25 minutes. A passing grade requires easy removal with no sticking.

Caramel: Individually wrapped hard caramels were unwrapped and placed on baking paper in a baking pan and heated at 177° C. for 15 minutes or until melted, cooled to room temperature, and peeled off the baking paper. Non-stick easy removal is a pass.

Of the actual baking tests, the chocolate cake test is the most difficult to pass, possibly because of the presence of all of moisture, grease, proteinaceous substances, and polysaccharides. The inventive baking papers were superior to all-silicone coated papers as well as QUILON® coated papers, as shown by the following examples.

COMPARATIVE EXAMPLE 1

A twenty-four pound paper coated with an addition-curable silicone, DEHESIVE® 427, available from Wacker Chemie AG was used as the baking paper. The coating weight was 182 g/ream.

COMPARATIVE EXAMPLE 2

A commercial QUILON® coated parchment was used as the baking paper.

EXAMPLES 1 AND 2

Coating formulations were prepared by admixing the ingredients presented in Table 1. In the Table, DEHESIVE® EM 427 is a 54 wt. % aqueous dispersion of a linear, vinyl-functional polydimethylsiloxane, available from Wacker Chemie AG; WACKER® Catalyst EM 459 is an 44% aqueous dispersion of a vinyl-functional siloxane containing 619 ppm platinum catalyst, from Wacker Chemie AG; WACKER® Crosslinker V 72 is a trimethylsilyl-terminated poly(hydrogenmethyl)siloxane from Wacker Chemie AG; VINNAPAS® EF 104 is a 55 wt. % solids dispersion of an EVA polymer having a glass transition temperature of 14° C., a mean particle size of 230 nm and an emulsion viscosity of 400 cps, available from Wacker Polymer Systems; KELTROL® is a 1% solution of a xanthan gum available from CP Kelco Co., Atlanta, Ga.; and Foamblast™ 325 is a defoamer available from Emerald Material. Each aqueous coating composition contained 10% total solids.

TABLE 1

| Ingredients in grams | Example 1 | Example 2 |
| --- | --- | --- |
| Dehesive ® EM 427 | 7.03 | 15.09 |
| Catalyst EM 459 | 1.72 | 2.48 |
| Crosslinker V 72 | 1.29 | 2.55 |
| Vinnapas ® EF 104 | 34.94 | 25.85 |
| Keltrol ® | 36.00 | 36.00 |
| Foamblast ™ | 0.42 | 0.42 |
| Water | 168.60 | 167.61 |
| Silicone solids based on total solids | 20% | 40% |

The coatings of Examples 1 and 2 were applied to paper at a coating weight of 282 g/ream using an emulsion coating and dried at 160° C. for 30 seconds.

Test Results:

Test results of the baking papers of Comparative Examples 1 and 2 and inventive Examples 1 and 2 are presented below.

TABLE 2

| | Example | | | |
| --- | --- | --- | --- | --- |
| Test | C1 | C2 | 1 | 2 |
| Cookie Release | Pass | Pass | Pass | Pass |
| Grease Soak In | Pass | Fail | Pass | Pass |
| Chocolate Cake | Fail | Fail | Fail | Pass |
| Macaroon | Pass | Pass | Pass | Pass |
| Caramel | Pass | Pass | Pass | Pass |
| Turpentine | 5 min. | <1 min. | 30 min. | 30 min. |

The inventive coatings were far better in the turpentine test, which is also reflected in the Grease Soak, is the residual grease that is left from baking a cookie. A pass means the grease stays on the surface of the baking paper. A fail means it transferred to the other side, i.e. "soaked in." In Inventive Example 1, with only 20% silicone, the inventive composition did not fare well in the chocolate cake test, actually being inferior to QUILON coated parchment paper (if the Example 1 composition was also coated on parchment paper, the results might have been different). However, the Inventive Example 1 formulation passed all other tests. The Example 2 formulation passed all tests, the only baking paper of these examples to do so.

FIGS. 1A and 1B show the improvement which the Example 2 coating achieves in comparison to the widely used chromate-coated paper, as demonstrated by the chocolate cake test.

EXAMPLE 3

Example 1 was repeated, but VINNAPAS® EF 575 was substituted for VINNAPAS® EF 104. VINNAPAS® EF 575 is a surfactant stabilized EVA copolymer dispersion with an EVA copolymer glass transition temperature of 0° C., a solids content of nominally 55 weight percent, dynamic viscosity 200-850 mPa·s, and pH in the range of 4.0-5.0. Mean particle size is ca. 200 nm. Silfoam™ SE33 was substituted for Foamblast™ 325. The results are presented in Table 3.

COMPARATIVE EXAMPLE C4

Example 1 was repeated, but the VINNAPAS® EF 104 was substituted with a polyvinyl alcohol stabilized EVA copolymer dispersion (55% solids), having a copolymer Tg of −14° C., dynamic viscosity of 1700-3300 mPa·s, and predominant particle size of 1200 nm. Results are presented in Table 3.

COMPARATIVE EXAMPLE C5

Example 1 was repeated, but VINNAPAS® EF 104 was substituted by an EVA 55 wt. % copolymer dispersion having a particle size of 1200-1800 nm, stabilized by polyvinyl alcohol. The copolymer Tg was 17° C. Results are presented in Table 3.

COMPARATIVE EXAMPLE C6

Example 1 was repeated, but VINNAPAS® EF 104 was substituted by Hycar® 26288 (Lubrizol), a 40-50 wt. % dispersion of a carboxylated acrylic copolymer, stabilized by an anionic surfactant, an FDA approved coating dispersion. The results are presented in Table 3.

TABLE 3

| (Non-Stick Performance of 20% Silicone Baking Papers) | | | | | |
| --- | --- | --- | --- | --- | --- |
| Example | Particle Size | Stabilizer | Cookie | Cake | Turpentine |
| 1 | 230 nm | surfactant | pass | fail | pass |
| 3 | 200 nm | surfactant | pass | pass | pass |
| C4 | 1200 nm | PVOH | fail | fail | fail |
| C5 | 1200-1800 nm | PVOH | pass | fail | pass |
| C6 | 700 nm | surfactant | pass | fail | fail |

The results in Table 3 indicate that in "stressed" coating compositions containing only 20 weight percent silicone, surfactant-stabilized, small particle size EVA copolymers were surprisingly superior to coatings containing larger particles and stabilization by polyvinyl alcohol (PVOH).

The use of carboxylated acrylic copolymers, even though surfactant stabilized, also failed.

In view of the fact that the glass transition temperature of the EVA polymers is relatively low, it is highly surprising that coatings with significant amounts of such polymers, such as the baking papers of the claimed invention, provide non-stick properties and grease resistance at the high temperatures used in baking, and this is even more surprising in view of the fact that the coatings also contain a cured silicone, which itself has little grease resistance.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A baking paper comprising a non-stick coating on at least one side of a substrate, wherein the non-stick coating comprises from 10 to 50 weight percent of a cured, hydrosilylation-curable silicone elastomer composition, and from 90 to 50 weight percent of an ethylene/vinyl acetate copolymer, the weight percents based on the sum of silicone components and ethylene/vinyl acetate copolymer solids, wherein the ethylene/vinyl acetate copolymer has been derived from an ethylene/vinyl acetate copolymer dispersion having mean particle size of less than 500 nm and is surfactant-stabilized, and wherein the cured hydrosilylation-curable silicone elastomer composition is cured in the presence of the ethylene/vinyl acetate copolymer.

2. The baking paper of claim 1, wherein based on total coating solids, the silicone components of the hydrosilylation-curable silicone component are present in an amount of from 20 weight percent to 50 weight percent.

3. The baking paper of claim 1, wherein the coating further comprises a dried product of a natural gum.

4. The baking paper of claim 1, which exhibits a turpentine absorbtion time of >30 minutes.

5. The baking paper of claim 1, wherein the mean particle size of the ethylene/vinyl acetate copolymer is from 100 nm to 350 nm.

6. The baking paper of claim 1, wherein the mean particle size of the ethylene/vinyl acetate copolymer is from 150 nm to 300 nm.

7. The baking paper of claim 1, wherein the ethylene/vinyl acetate dispersion is stabilized by a stabilizer composition comprising an anionic surfactant, or by a stabilizer composition comprising an anionic surfactant and a non-ionic surfactant.

8. The baking paper of claim 5, wherein the ethylene/vinyl acetate dispersion is stabilized by a stabilizer composition comprising an anionic surfactant, or by a stabilizer composition comprising an anionic surfactant and a non-ionic surfactant.

9. The baking paper of claim 1, wherein the substrate comprises paper.

10. In a process for the preparation of a non-stick baking paper, wherein a non-stick coating composition is applied to at least one side of a substrate, the improvement comprising:
 a) coating the substrate with an aqueous coating composition containing from 5 to 40 parts solids per 100 parts coating composition, the coating composition comprising a dispersion or emulsion of from 10-50 weight percent of a at least one hydrosilylation-curable silicone composition and 90-50 weight percent of at least one ethylene/vinyl acetate copolymer, these weight percents based on the total of the silicone composition and the ethylene/vinyl acetate copolymer;
 b) drying the paper obtained in step a) and curing the hydrosilylatable-curing silicone composition,
 wherein the ethylene/vinyl acetate dispersion has a particle size of less than 500 nm and is surfactant-stabilized, to obtain a baking paper of claim 1.

11. The process of claim 10, wherein the ethylene/vinyl acetate copolymer and the hydrosilation-curing silicon composition, when cured, meet regulatory requirements for contact with food for humans.

12. The process of claim 10, wherein the aqueous coating composition further comprises an emulsion stabilizer.

13. The process of claim 12, wherein at least one emulsion stabilizer comprises a natural gum.

14. The process of claim 13, wherein the natural gum comprises a polysaccharide gum.

15. In a process for preparing foodstuffs on or in a baking container with a baking paper wherein foodstuff contacts the baking paper at a temperature >100° C., the improvement comprising selecting as the baking paper, a baking paper of claim 1.

16. The baking paper of claim 1, wherein the hydrosilylation-curable silicone composition comprises at least one organopolysiloxanes bearing hydrosilylatable alkenyl or alkynyl groups, an organopolysiloxanes bearing Si—H groups, and a hydrosilylation catalyst.

17. The process of claim 10, wherein the hydrosilylation-curable silicone composition comprises at least one organopolysiloxanes bearing hydrosilylatable alkenyl or alkynyl groups, an organopolysiloxanes bearing Si—H groups, and a hydrosilylation catalyst.

18. The baking paper of claim 1, wherein the ethylene/vinyl acetate copolymer comprises vinyl acetate-derived moieties and from 1 to 50 weight percent ethylene derived moieties.

19. The baking paper of claim 1, wherein the ethylene/vinyl acetate copolymer comprises vinyl acetate-derived moieties and from 1 to 30 weight percent ethylene derived moieties.

20. The baking paper of claim 1, wherein the ethylene/vinyl acetate copolymer comprises vinyl acetate-derived moieties and from 5 to 20 weight percent ethylene derived moieties.

* * * * *